United States Patent [19]
Ueda et al.

[11] Patent Number: 5,764,388
[45] Date of Patent: Jun. 9, 1998

[54] METHOD AND DEVICE FOR CONVERTING COLOR SIGNAL

[75] Inventors: Masashi Ueda; Ryohei Komiya, both of Nagoya, Japan

[73] Assignee: Brother Kogyo Kabushiki Kaisha, Aichi-Ken, Japan

[21] Appl. No.: 702,005

[22] Filed: Aug. 23, 1996

[30] Foreign Application Priority Data

Aug. 25, 1995 [JP] Japan ................ 7-217201

[51] Int. Cl.$^6$ ........................ G03F 3/08
[52] U.S. Cl. ............. 358/529; 358/523; 382/163
[58] Field of Search ................ 358/500, 530, 358/537, 501, 515, 520, 523, 529; 382/162, 163

[56] References Cited

U.S. PATENT DOCUMENTS 5,032,904  7/1991  Murai ............................ 358/75
5,289,297  2/1994  Bollman et al. ................. 358/537

*Primary Examiner*—Thomas D. Lee
*Assistant Examiner*—Jerome Grant, II
*Attorney, Agent, or Firm*—Kane,Dalsimer,Sullivan, Kurucz, Levy, Eisele and Richard, LLP

[57] ABSTRACT

Described is a method and a device for converting a color signal consisting of a plurality of chromatic color components into another color signal consisting of the plurality of chromatic color components and an achromatic color component. Firstly, an achromatic value is obtained, and then an under color addition is executed to obtain a chromatic value for each of the plurality of chromatic color components. Then, whether the chromatic values for the plurality of chromatic color components should be replaced with predetermined values is examined. If it is determined that the chromatic values for the plurality of chromatic color components should be replaced with predetermined values, the chromatic values are replaced with the predetermined values, and the another color signal consisting of the chromatic color components having the chromatic values and the achromatic color component having the achromatic value is output as the converted signal.

20 Claims, 9 Drawing Sheets

METHOD AND DEVICE FOR CONVERTING COLOR SIGNAL

BACKGROUND OF THE INVENTION

The present invention relates to a method and device for converting a color signal consisting of chromatic color components representative of additive primaries or subtractive primaries into another color signal including an achromatic color component.

Conventionally, a color is expressed with reference to a plurality of predetermined color components. For example, according to a CIE-RGB calorimetric system, a color is expressed with use of values representative of red (R), green (G) and blue (B). According to a CIE 1931 XYZ calorimetric system, a color is expressed with use of three values X, Y and Z which are defined based on characteristics of stimulus of human being. Further, values L*, a*, and b* of the CIE-LAB color space, or values L*, u* and v* of the CIE-LUV color space are also known for expressing a color.

In order to reproduce a color by printing, for example, only values representing density of subtractive primaries, i.e., Cyan, Magenta and Yellow which are complementary colors of Red, Green and Blue are to be given. However, practically, when the subtractive primaries are used for reproducing all the colors, a problem arises. If ink having colors of Cyan, Magenta and Yellow does not have ideal light absorbing characteristics, achromatic color reproduced by adding the subtractive primaries may not have sufficient density, and the reproduced image may not satisfy human eyes.

To deal with the above problem, a black ink is used as a fourth ink for increasing density at black portions of the image so that the black portions have sufficient density. For this purpose, conventionally, in a field of printing, a color signal consisting of three color components such as Red, Green and Blue (or, Cyan, Magenta and Yellow) into another signal including an achromatic component (K) as well as the chromatic color components. This conversion is known as a Black Generation.

Recently, when the black generation is done, in order to improve the efficiency in consumption of ink, and reproductivity in terms of the gradation, after the achromatic component (K) is generated, component values (i.e., quantities) of the primaries, i.e., Cyan, Magenta and Yellow components are compensated based on the generated achromatic component. Decreasing of the chromatic components in this process is known as a UCR (Under Color Removal), and increasing of the chromatic components is know as a UCA (Under Color Addition). Conventionally, various method for the BG, UCR and UCA process have been developed.

Among them, so-called an achromatic-synthesis method (which is also known as "Unbunt Aufban", and will be referred to as an achromatic method hereinafter) is widely known for UCR, especially in various countries in Europe.

The achromatic method is a method which uses two chromatic color ink, and one achromatic color ink for reproducing all colors. An example of the achromatic method used in a color signal conversion device is explained below. In the example explained below, input color signal consists of three chromatic color components, i.e., Cyan (Ci), Magenta (Mi) and Yellow (Yi), and output color signal consists of four color components including three chromatic color components Cyan (Co), Magenta (Mo) and Yellow (Yo), and one achromatic color component (K).

FIG. 1 shows a component value of each color component Ci, Mi and Yi to be used for reproducing a color. In the figure, Ci=100%, Mi=75% and Yi=50%. Portion of each component labelled as an achromatic value in FIG. 1 is a portion which can be replaced with the achromatic value Ko, and portion labelled as a chromatic value is a portion cannot be replaced with the achromatic value Ko. In this example, the minimum value of the three values, i.e., the value of the Yellow component Yi is replaced with the achromatic component Ko. The replacement is called as the UCR as mentioned above.

From each of the values Ci, Mi and Yi, the achromatic value (=Ko) is subtracted to obtain the output values of the components Co, Mo and Yo.

Co=100%−50%=50%

Mo=75%−50%=25%

Yo=50%−50%=0%

With this conversion (i.e., subtraction), a color signal consisting of three chromatic components (i.e., Ci, Mi and Yi) can be converted to another color signal consisting of four components (i.i., Co, Mo, Yo and Ko) as shown in FIG. 2.

When an image scanner is used for obtaining a color signal of an original image, the scanner may not be stably positioned with respect to the original, and there may be stained portions on the original. In such a case, even if an area of the original have the same color, the color signal generated by the scanner may include information representing blur between respective color components.

For example, even if a gray area of the original is scanned, the components of the color signal generated by the scanner may not show the same value over the entire gray area due to the unevenly distributed illumination on the original, unevenness of sensitivity of each element of the scanner, and the like. In such a condition, if the above-described achromatic method is performed, the chromatic color components, i.e., C, M or Y may be erroneously added onto the gray area which should be reproduced only with the achromatic color component K.

Further, when the border between the achromatic color (gray) area and chromatic color area of the original is scanned, positional errors may occur between the components of the color signal. In such a case, the chromatic components may be erroneously added to the achromatic color (gray) area.

Human stimulus can distinguish the above described color difference between the chromatic color components and the achromatic color component easily. Therefore, the above-described condition is recognized easily, and may be considered that the reproduced image has a bad quality.

SUMMARY OF THE INVENTION

It is therefore an object of the invention to provide an improved color signal conversion device which can prevent the unevenness of color or blur of color due to the unstableness of the scanner and the like.

For the above object, according to an aspect of the invention, there is provided a method of converting a color signal consisting of a plurality of chromatic color components into anther color signal consisting of the plurality of chromatic color components and an achromatic color component, the method comprises the steps of:

obtaining an achromatic value of the achromatic color components;

executing an under color removal in order to obtain a chromatic value for each of the plurality of chromatic color components;

determining whether the chromatic values for the plurality of chromatic color components should be replaced with predetermined values;

replacing the chromatic values with the predetermined values if it is determined in the determining step that the chromatic values for the plurality of chromatic color components should be replaced with predetermined values; and outputting the another color signal, the chromatic components and achromatic component of the another color signal having the chromatic values and the achromatic value, respectively.

Optionally, the chromatic color components comprise components of subtractive primaries. It is possible to use additive primaries instead of the subtractive primaries. In such a case another signal processing method may be used instead of the UCR.

Further optionally, the determining step may include the steps of:

calculating ratios of the chromatic values to the achromatic value, respectively;

obtaining the maximum value among the ratios of the chromatic values to the achromatic value; and comparing the maximum value with a predetermined threshold value, and wherein the determining step determines that the chromatic values for the plurality of chromatic color components should be replaced with predetermined values if the maximum value is smaller than the threshold value.

The predetermined values may preferably be zero.

Still optionally, each of the predetermined values can be made changeable. In order to change the values, an input means such as a keyboard may be utilized.

Alternatively, the determining step may include the steps of:

calculating ratios of component values of the chromatic color components to the achromatic value;

obtaining the maximum value among the ratios of the component values to the achromatic value; and comparing the maximum value with a predetermined threshold value, and wherein the determining step determines that the chromatic values for the plurality of chromatic color components should be replaced with predetermined values if the maximum value is smaller than the threshold value.

Further, wherein the determining step may include the steps of:

obtaining the maximum value within the chromatic values;

calculating a threshold value; and comparing the maximum value with the threshold value, and wherein the determining step determines that the chromatic values for the plurality of chromatic color components should be replaced with predetermined values if the maximum value is smaller than the threshold value.

Optionally, the calculating step may calculate the threshold value in accordance with the achromatic value. In such a case, the calculating step may multiply the achromatic value by a predetermined coefficient to obtain the threshold value.

Further alternatively, the determining step may include the steps of:

obtaining the maximum value within component values of the chromatic color components;

calculating a threshold value; and comparing the maximum value with the threshold value, and wherein the determining step determines that the chromatic values for the plurality of chromatic color components should be replaced with predetermined values if the maximum value is smaller than the threshold value.

Optionally, the calculating step may multiply the achromatic value by a predetermined coefficient to obtain the threshold value.

According to another aspect of the invention, there is provided a color signal converting device for converting a color signal consisting of a plurality of chromatic color components into anther color signal consisting of the plurality of chromatic color components and an achromatic color component, the device comprises:

means for obtaining an achromatic value of the achromatic color components;

means for executing an under color removal in order to obtain a chromatic value for each of the plurality of chromatic color components;

means for determining whether the chromatic values for the plurality of chromatic color components should be replaced with predetermined values;

means for replacing the chromatic values with the predetermined values if the determining means determines that the chromatic values for the plurality of chromatic color components should be replaced with predetermined values; and means for outputting the another color signal, the chromatic color components and achromatic color component of the another color signal having the chromatic values and the achromatic value, respectively.

DESCRIPTION OF THE ACCOMPANYING DRAWINGS

DESCRIPTION OF THE EMBODIMENTS

Figure 1:
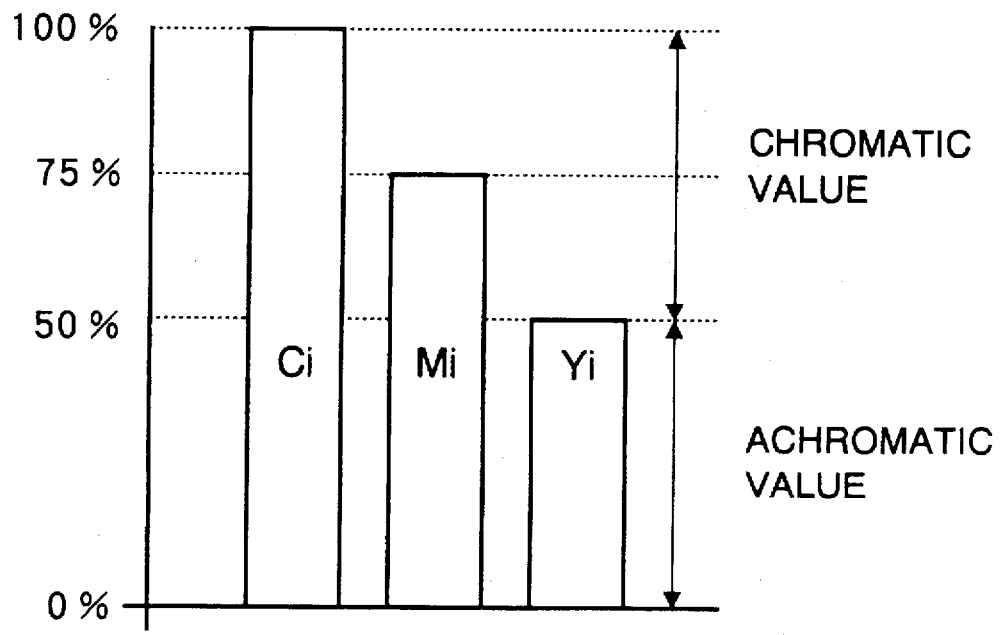
FIG. 1 shows chromatic color components Cyan (Ci), Magenta (Mi) and Yellow (Yi) of a color signal for expressing a color.
Figure 2:
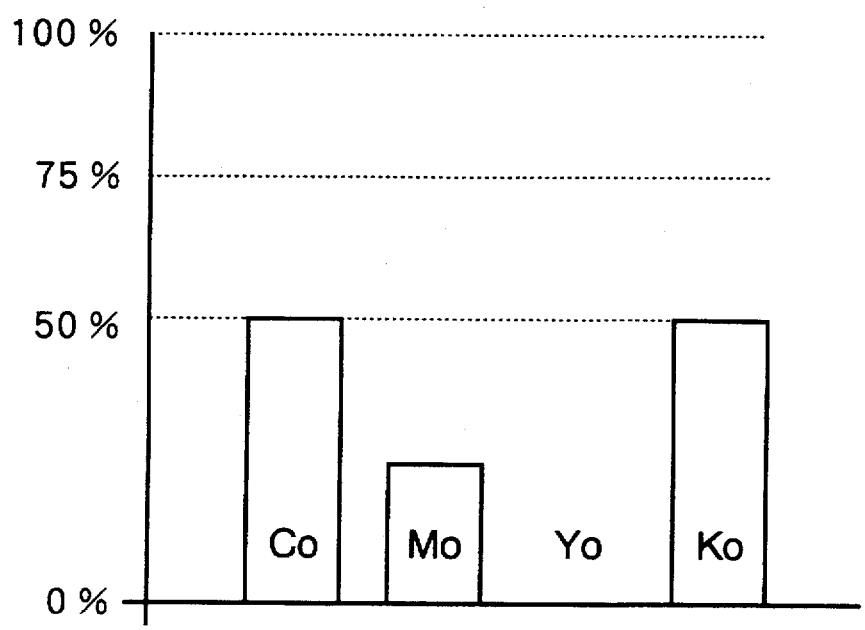
FIG. 2 shows a color signal which is obtained by applying UCR (under color removal) process to the color signal shown in FIG. 1.
Figure 3:
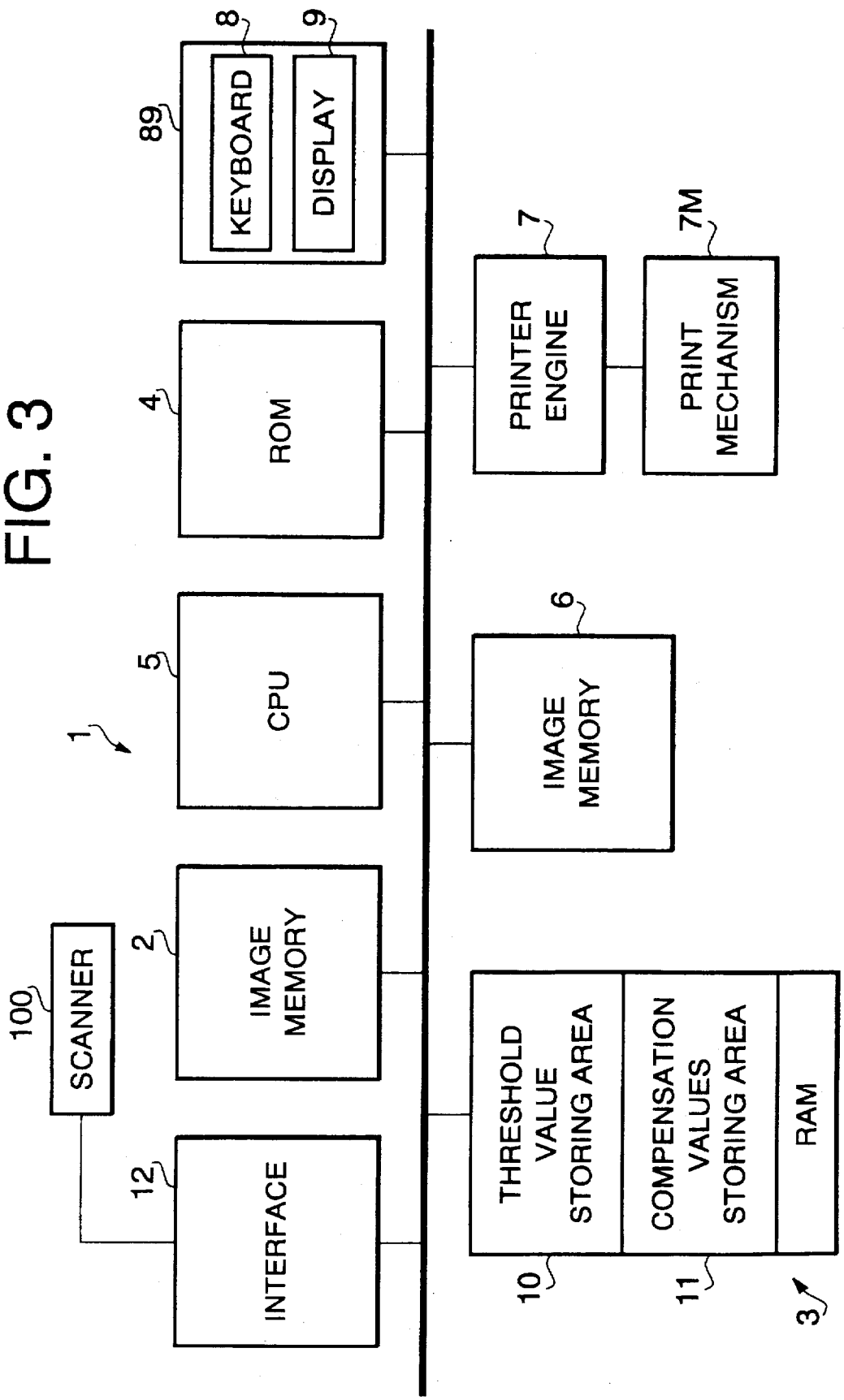
FIG. 3 is a block diagram of a color signal converting device according to a first embodiment of the invention.

FIG. 3 is a block diagram showing a color signal converting device 1 employed in a color ink jet printer as a first embodiment of the invention.

The color signal converting device 1 includes:

an original image memory 2 for storing gradation image data of an original image consisting of three color component data, i.e., Cyan (C), Magenta (M) and Yellow (Y);

a RAM (Random Access Memory) 3 to be used as a working register, a buffer and the like;

a ROM (Read Only Memory) 4 for storing various programs to be executed;

a CPU (Central Processing Unit) 5 for executing the programs stored in the ROM 4 to perform signal processing including UCR to the color image data stored in the image memory 2;

another image memory 6 for storing image data as processed by the CPU 5;

a printer engine unit 7 having printing mechanism 7M having color ink jet printing heads; and an input unit 89 including a keyboard 8 and a display 9.

Further, the color signal converting device 1 is provided with an interface 12, through which a color signal is transmitted. In this embodiment, the color signal is generated by an externally connected scanner 100. The scanner 100 is a color scanner which scans an image on an original and generates the color signal consisting of three chromatic color components. The color signal transmitted from the scanner 100 through the interface 12 is stored in the image memory 2.

When the UCR is performed with respect to the image data stored in the image memory 2, for example, the color signal consisting of three chromatic color components is converted into a signal having three chromatic and one achromatic color components and stored in the image memory 6.

A part of the RAM 3 is a non-volatile memory having a threshold value storing area 10 for storing a threshold value which is input through the keyboard 8, and a compensation values storing area 11 for storing compensation values which are also input through the keyboard 8.

Figure 4:
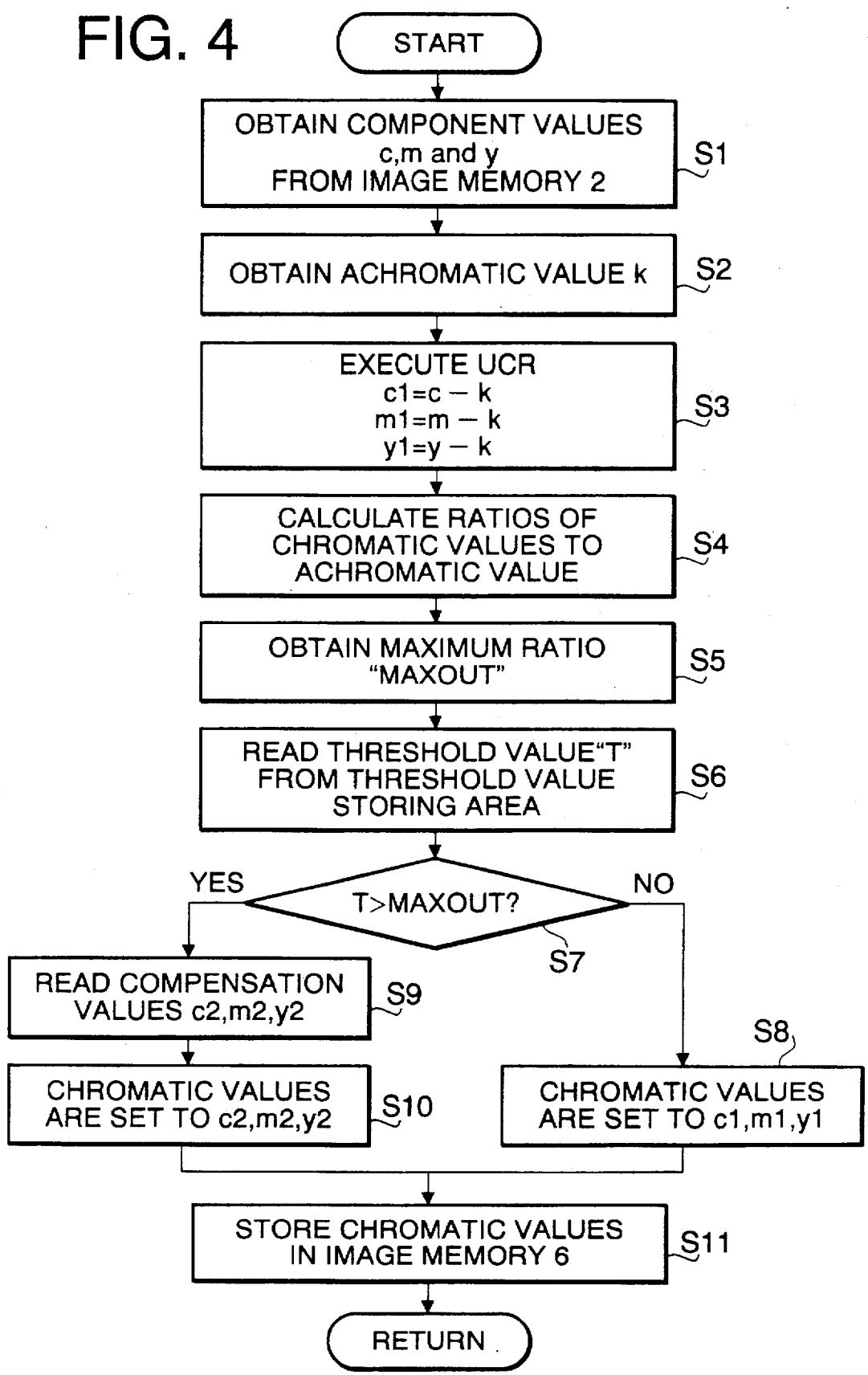
FIG. 4 is a flowchart illustrating a conversion of the color signal according to the first embodiment.

FIG. 4 is a flowchart illustrating a process for converting the color signal consisting of three chromatic color components (C, M and Y) into a color signal consisting of three chromatic and one achromatic color components (C, M, Y and K).

At step S1, the CPU 5 reads components values c, m and y of the chromatic color components C, M and Y for a pixel of an image out of the image memory 2. In step S2, an achromatic value k for the achromatic color component K is calculated with use of the following equation (1).

$$k = \min(c, m, y) \quad (1)$$

where, min ( ) is defined as a function representing the minimum value among the values in the parenthesis. Therefore, in S2, the minimum value within the component values c, m and y is selected and the selected minimum value is used as the value of the achromatic component K.

In step S3, in accordance with the following equations (2), the UCR for respective components C, M and Y is executed to obtain the chromatic values c1, m1 and y1.

$$c1 = c - k$$
$$m1 = m - k \quad (2)$$
$$y1 = y - k$$

where, the values c1, m1 and y1 are the chromatic values corresponding to the chromatic color components C, M and Y. In other words, by removing the achromatic value k included in the component values c, m and y of the input color signal, the chromatic values are obtained in S3.

Note that one of the chromatic values c1, m1 or y1 having the minimum value becomes zero after S3 has been executed. Therefore, after the UCR is done, a color can be expressed with reference to two chromatic color components and one achromatic color component.

In S4, with use of the following equations (3), a ratio of each chromatic value c1, m1 and y1 to the achromatic value k is calculated.

$$rateC = c1/k$$
$$rateM = m1/k \quad (3)$$
$$rateY = y1/k$$

where rateC, rateM, rateY are the ratios of the color components C, M and Y, and the ratio to the achromatic value k is greater as the chromatic value of the corresponding component is greater.

In S5, the maximum value MAXOUT among the ratios rateC, rateM and rateY is obtained in accordance with the equation (4).

$$MAXOUT = \max(rateC, rateM, rateY) \quad (4)$$

where, max( ) is defined as a function representing the maximum value within the parenthesis.

In S6, the CPU 5 reads out the threshold value T stored in the threshold value storing area 10 of the RAM 3, and compares the maximum value MAXOUT with the threshold value T.

If the threshold value T is not greater than the maximum value MAXOUT, i.e., if the maximum value MAXOUT is equal to or greater than the threshold value T, control goes to S8. At S8, the chromatic values of the color components C, M and Y are set to the chromatic values c1, m1, and y1, respectively.

If the threshold value is greater than the maximum value MAXOUT, the CPU 5 reads compensation values c2, m2 and y2 which are pre-stored in the compensation values storing area 11 of the RAM 3. Then at S10, the chromatic values of the color components C, M and Y are set to the compensation values c2, m2 and y2, respectively.

In S11, a set of values (c1, m1, y1) or (c2, m2, y2) corresponding to the color components C, M and Y determined in S8 or S10, and the achromatic value k obtained with use of the equation (1) are stored in the image memory 6 as the color signal consisting of the three chromatic and one achromatic color components C, M, Y and K at an address corresponding to the address of the image memory 2 from which the input color signal is obtained (S11).

The color signal converting process as described above is repeatedly executed until the color signal for every pixel of the original image data stored in the memory 2 is converted and the converted signal is stored in the image memory 6 as a converted data.

The data stored in the image memory 6 is further processed so that the data can be used for controlling the color ink jet printing mechanism 7M provided in the print engine unit 7. Then, by the print engine unit 7, the ink is projected from four ink heads corresponding to the four color components C, M, Y and K, and a color image is reproduced on a recording medium.

An numerical example will be shown below.

Assume that the threshold value stored in the threshold value storing area 10 is 0.1 (T=0.1) and the compensation value stored in the compensation values storing area 11 are such that c2=0, m2=0 and y2=0. In this case, if the ratio calculated with use of the equation (3) are (rateC=0, rateM=0.02 and rateY=0.03), the maximum value MAXOUT is 0.03, which is smaller than the threshold value T (=0.1). Therefore, in this case, the chromatic values of the chromatic color components C, M, Y and, the achromatic value of the achromatic component K are determined to be (c2, m2, y2, k), and more specifically (0, 0, 0, k). Accordingly, when the maximum value MAXOUT among the ratios of the chromatic values (c1, m1, y1) to the achromatic value k is smaller than the threshold value T, the chromatic values of the chromatic color components C, M and Y become zero, and only the achromatic color component K has a value.

In the above case, the chromatic values of the components C, M and Y depend on the compensation values c2, m2, y2 stored in the compensation values storing area 11. If the compensation values c2, m2, and y2 are set to zero (i.e., c2=0, m2=0, y2=0), then unevenness of color distribution or blur among color components due to the unstableness of the reading characteristics of a scanner can be prevented. That is, if the image cannot be reproduced as an achromatic image due to the unstable characteristics of the scanner 100, the color signal generated by the scanner 100 can be converted into the color signal having only the achromatic color component, and therefore the achromatic color image can be reproduced.

Note that above described threshold value T and the compensation values c2, m2 and y2 are not limited to the above described values. The above described compensation values are exemplary values, and the compensation values can be input or changed in accordance with the type of the original image, desired hue of the image to be reproduced, and the like. The values can be input or changed with use of the keyboard 3.

If an operator is to change the threshold value T stored in the threshold value storing area 10 of the RAM 3, an operation mode of the printer is changed to a threshold value changing mode by operating a threshold changing key (not shown). In this mode, if the operator input a new value through the keyboard 8, the CPU 5 receives the input new value and replace the threshold value T stored in the threshold value storing area 10 with the newly input value. With this operation, the operator can change the threshold value T freely.

In order to change the compensation values c2, m2 and y2 stored in the compensation values stored area 11, the operation mode is changed to a compensation value changing mode by operating a compensation value changing key (not shown). In this mode, when the operator inputs the new values through the keyboard 8, the CPU 5 receives the newly input values and replace the compensation values stored in the compensation values storing are 11 with the newly input values. Thus, the operator can also change the compensation values (c2, m2, y2) easily.

As described above, since the operator can adjust the values stored in the threshold value storing area 10 and the compensation value storing area 11, the operator is enabled to have a desired signal converting characteristics, and therefore the operator can have a preferable image reproduced.

Figure 5:
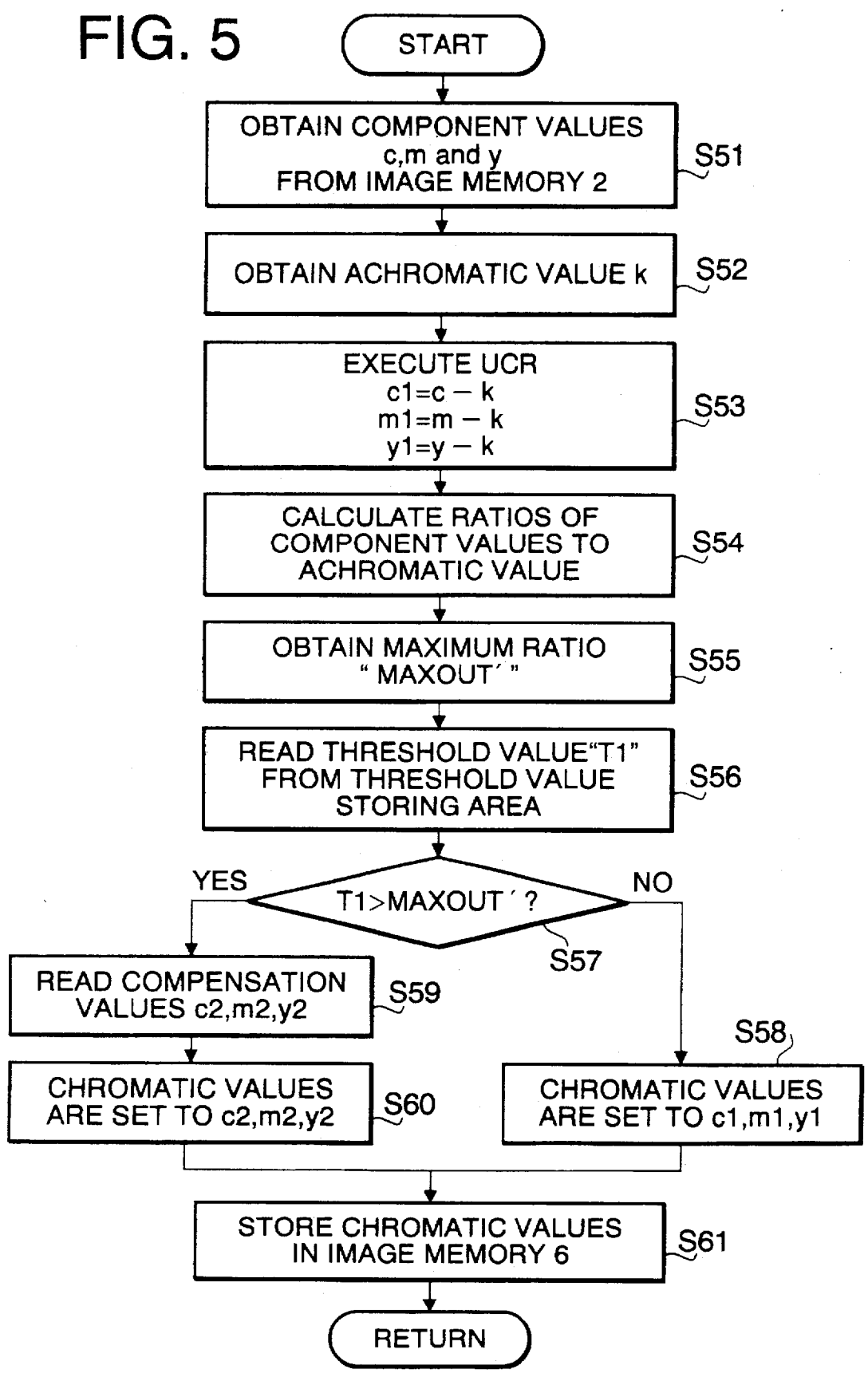
FIG. 5 is a flowchart illustrating a conversion of the color signal according to a second embodiment.

FIG. 5 is a flowchart illustrating a second embodiment according to the present invention. In the second embodiment, another process for determining the compensation values c2, m2, y2 is employed. The structure of the printer is similar to the first embodiment (see FIG. 3), and accordingly the description thereof is omitted. In the second embodiment, similar to the first embodiment, a color signal consisting of three chromatic color components is converted into a color signal consisting of three chromatic and one achromatic color components.

In FIG. 5, steps S51 through S53 are similar to steps S1 through S3 of FIG. 3. After the UCR is performed at S53, i.e., the chromatic values c1, m1 and y1 are calculated, ratio of the component values c, m and y to the achromatic value k are obtained at S54. Note that in the first embodiment, ratios of the chromatic values c1, m1 and y1 to the achromatic value k are calculated. In the second embodiment, ratios of the component values c, m and y with respect to the achromatic value k are calculated according to the equations (5).

$$rateC'=c/k$$
$$rateM'=m/k \quad (5)$$
$$rateY'=y/k$$

After the rateC', rateM' and rateY' are obtained, the CPU 5 obtains the maximum ratio MAXOUT' among the ratios rateC', rateM' and rateY' in accordance with the following equation (6).

$$MAXOUT'=max(rateC', rateM', rateY') \quad (6)$$

Then, at S56, the CPU 5 reads a threshold value T1 out of the threshold value storing area 10 of the RAM 3 at S56. At S57, the maximum ratio MAXOUT' is compared with the threshold value T1. Depending on the result of the comparison at S57, the chromatic values c1, m1, y1 or the compensation values c2, m2, y2 are selected as the chromatic values for the converted color signal (S57 through S60). This process is similar to that executed in steps S7 through 10 in FIG. 3, and the description thereof is omitted. After the chromatic values (i.e., the component value of the chromatic components of the converted color signal) are determined as described above, the determined chromatic values and the achromatic value k (i.e., the component value of the achromatic component of the converted color signal) are stored in the image memory 6 at S61.

In the second embodiment, if the threshold value T1 satisfies the following relationship (7), the result in the second embodiment is the same as the result of the first embodiment.

$$T1=T+1 \quad (7)$$

where, T is the threshold value used in the first embodiment.

Figure 6:
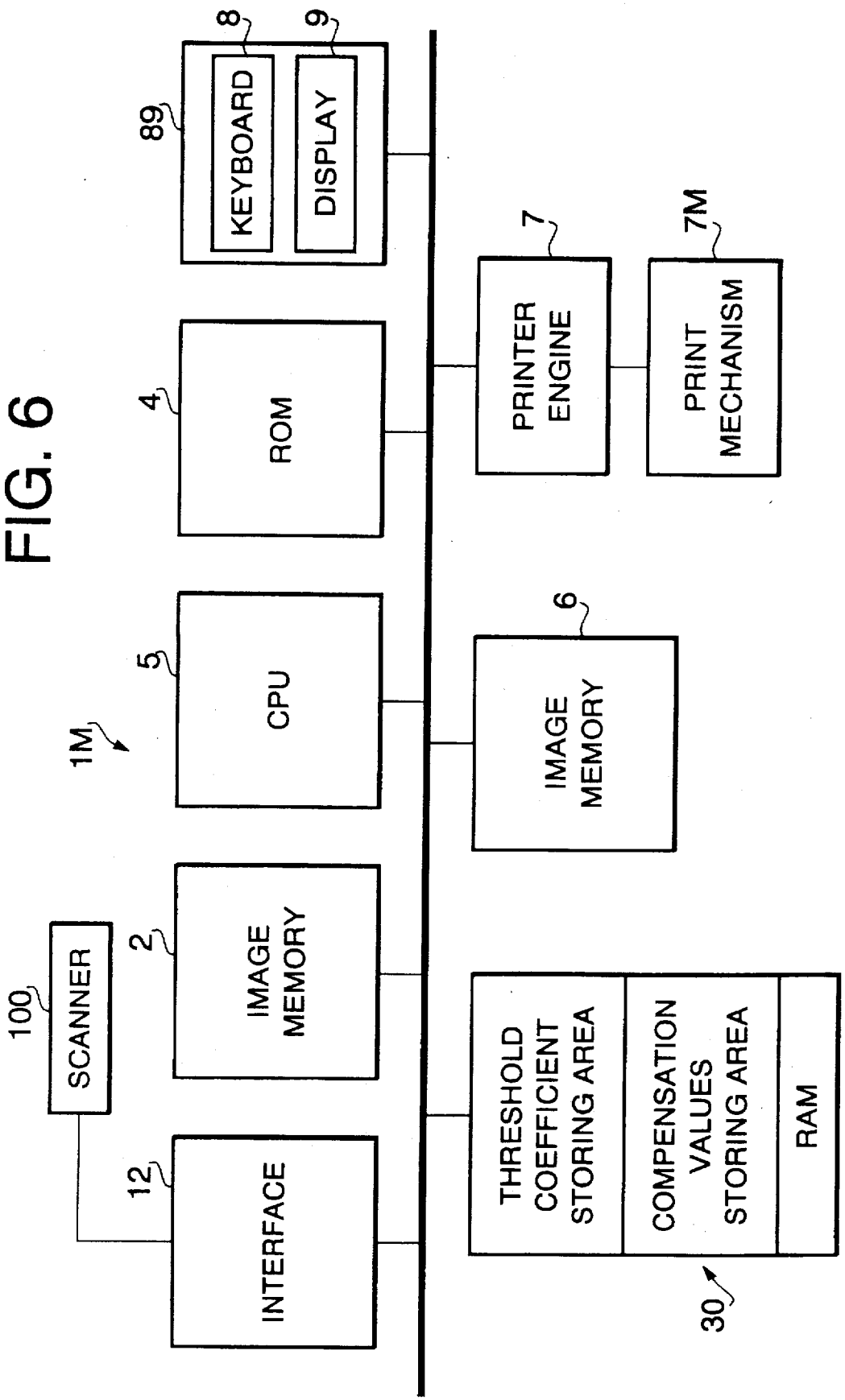
FIG. 6 is a block diagram of a color signal converting device according to a third embodiment of the invention.

FIG. 6 is a block diagram showing a third embodiment of the color signal converting device 1M employed in the color ink jet printer. In FIG. 6, a RAM 30 is provided instead of the RAM 3 in FIG. 3. The other portions are similar to those in the first embodiment. At least a part of the RAM 30 is a non-volatile memory which has a threshold coefficient storing area 20, and a compensation values storing area 21. The compensation values storing area 21 is similar to the compensation values storing area 10 of the RAM 3 shown in FIG. 3, and stores the compensation values c2, m2 and y2. The threshold coefficient storing area 20 stores a threshold coefficient t which is input with use of the input unit 89 having the keyboard 8 and the display 9. The threshold coefficient t will be described in detail later.

In the third embodiment, the threshold coefficient t stored in the threshold coefficient storing area 20 and the compensation values c2, m2 and y2 stored in the compensation values storing area 21 can be changed with use of the input unit 89 including the keyboard 8 and the display 9.

Figure 7:
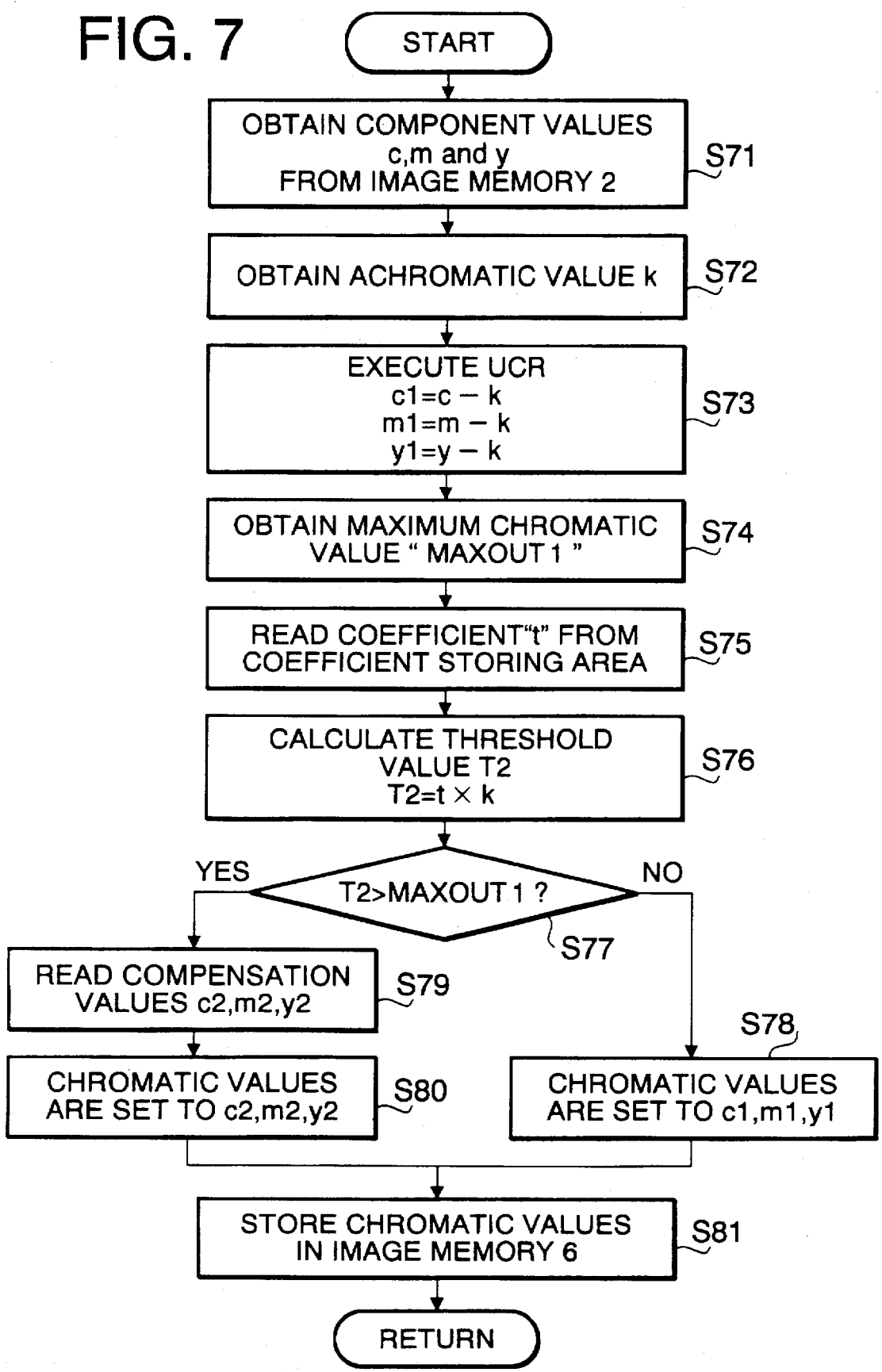
FIG. 7 is a flowchart illustrating a conversion of the color signal according to the third embodiment.

FIG. 7 is a flowchart illustrating a signal converting process employed in the third embodiment. In the third embodiment, similar to the first and the second embodiments, a color signal having three chromatic color components is converted into a color signal having three chromatic and one achromatic color components.

Steps S71 through S73 are similar to steps S1 through S3 shown in FIG. 4, and the description thereof is omitted. After the chromatic values c1, m1 and y1 are obtained, i.e., the UCR is performed at S73, the maximum value MAXOUT1 among the chromatic values c1, m1 and y1 is obtained in accordance with the following equation (8) at S74.

$$MAXOUT1 = max(c1, m1, y1) \qquad (8)$$

Then, at S75, the CPU 5 reads the threshold coefficient t from the threshold coefficient storing area 20. At S76, based on the threshold coefficient t and the achromatic value k, a threshold value T2 is calculated in accordance with the following equation (9).

$$T2 = t \times k \qquad (9)$$

At S77, the CPU 5 compares the MAXOUT1 with the threshold value T2. Then, depending on the comparison result at S77, the chromatic values c1, m1, y1 or the compensation values c2, m2, y2 are selected as new chromatic values (in S77 through S80). This process is similar to that done at S7 through S10 in FIG. 4, and accordingly the description thereof is omitted. Thereafter, the new chromatic values and the achromatic value k are stored in the image memory 6 (S81).

If the threshold coefficient t is set to T, which is the threshold value used in the first embodiment, then the result of the process shown in FIG. 7 becomes similar to the result of the process shown in FIG. 3.

Figure 8:
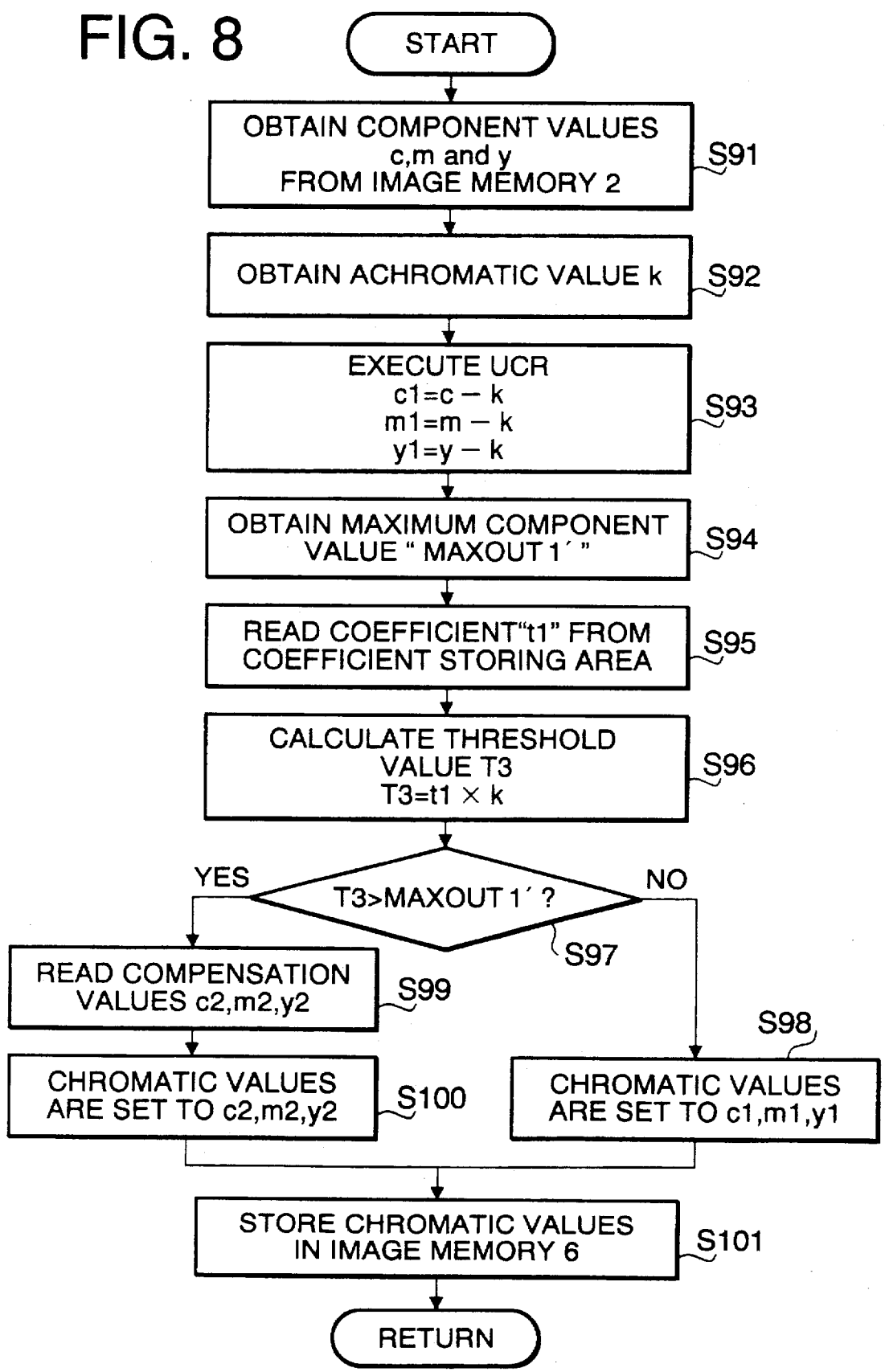
FIG. 8 is a flowchart illustrating a conversion of the color signal according to a fourth embodiment.

FIG. 8 is a flowchart illustrating a process executed in a fourth embodiment of the invention. The structure of the color signal converting device 1M of the fourth embodiment is similar to that of the third embodiment (shown in FIG. 6). In the fourth embodiment, likewise the first, second and third embodiments, the color signal converting device 1M of the third embodiment converts a color signal consisting of three chromatic color components into a color signal consisting of three chromatic and one achromatic color components.

In FIG. 8, steps S91 through S93 are similar to steps S71 through S73 of FIG. 7. After the UCR is performed at S93, i.e., the chromatic values c1, m1 and y1 are calculated, the maximum value MAXOUT1 within the component values c, m, and y of the components C, M and Y is obtained in accordance with the following equation (10) at S94.

$$MAXOUT1' = max(c, m, y) \qquad (10)$$

At S95, the CPU 5 reads a threshold coefficient t1 out of the threshold coefficient storing area 20 of the RAM 30. Then, a threshold value T3 is calculated based on the threshold coefficient t1 and the value k in accordance with the following equation (11).

$$T3 = t1 \times k \qquad (11)$$

In step S97, the maximum value MAXOUT1' among the component values c, m and y is compared with the threshold value T3. Depending on the result of the comparison at S97, the chromatic values c1, m1, y1 or the compensation values c2, m2, y2 are selected as new chromatic values in steps S97 through S100, which process is similar to the process in S77 through S80 of FIG. 7. The selected chromatic values and the achromatic value k are stored in the image memory 6 at step S101.

Figure 9:
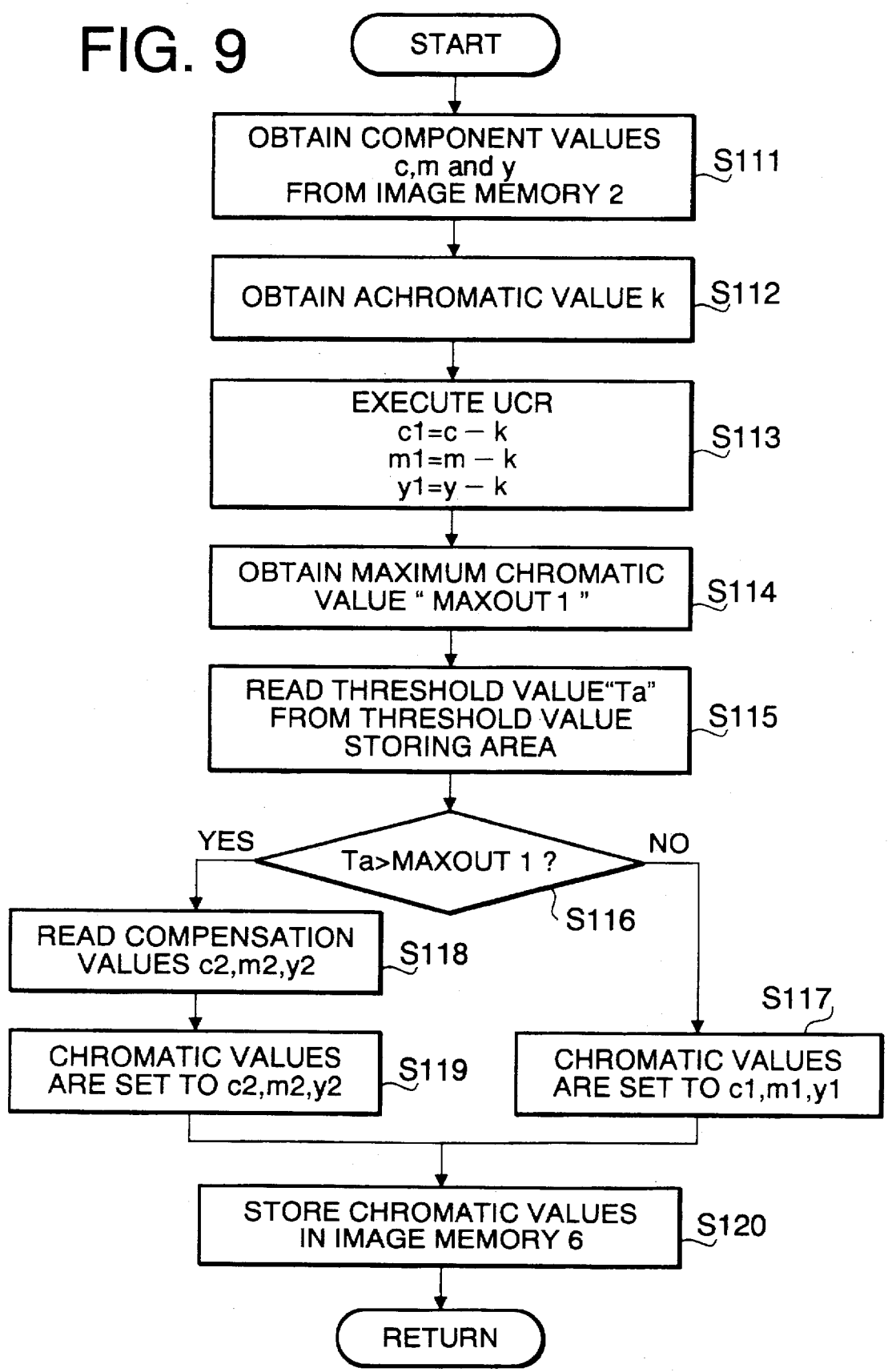
FIG. 9 is a flowchart illustrating a conversion of the color signal according to a fifth embodiment.

FIG. 9 is a flowchart illustrating a color signal converting process according to a fifth embodiment. The structure of the color signal converting device 1 is similar to the first embodiment shown in FIG. 3, and the description thereof is omitted. Similar to the foregoing embodiments, in the fifth embodiment, a color signal consisting of three chromatic color components C, M, and Y is converted into a color signal consisting of three chromatic and one achromatic color components C, M, Y and K.

In FIG. 9, steps S111 through S113 are similar to steps S1 through S3 of FIG. 4. After the UCR is performed in step S113 and the chromatic values c1, m1, y1 are obtained, the maximum value MAXOUT1 among the chromatic values c1, m1, y1 is obtained. In step S115, the CPU 5 reads a threshold value Ta from the threshold value storing area 10 of the RAM 3 of FIG. 3. Then, in S116, the maximum value OUT1 and the threshold value Ta are compared. Depending on the comparison result, the chromatic values c1, m1, y1 or the compensation values c2, m2, y2 are determined as the new chromatic values (S116 through S119). Then, in S120, the determined chromatic values and the achromatic value k are stored in the image memory 6.

If the compensation values are c2=0, m2=0 and y2=0, when the threshold value Ta is greater than the maximum value MAXOUT1, the new chromatic values for the components C, M, Y and K become 0, 0, 0 and k, respectively. That is, if the maximum value MAXOUT1 among the chromatic values c1, m1, y1 is smaller than the threshold value Ta, the new chromatic values of the components C, M and Y becomes zero, and only the achromatic component K is output.

Therefore, by setting the compensation values (c2, m2, y2) to c2=0, m2=0, and y2=0, unevenness and blur of color image due to the unstable reading characteristic of the scanner is made avoidable. Thus, even if it is difficult to obtain a color signal which enables to reproduce an achromatic color image, after the above conversion, the color signal is converted into appropriate signal, and the printer can reproduce a gray scale image stably.

Further, in the fifth embodiment, the maximum value MAXOUT1 among the chromatic values c1, m1, y1 corresponding to the chromatic color component C, M and Y are compared with the threshold value Ta directly, even when the value k is relatively small, the unevenness or blur of a color image can be prevented effectively.

In the fifth embodiment, after the UCR is executed at S113, the maximum value MAXOUT1 among the chromatic values within c1, m1, y1 and the threshold value Ta are compared. The similar result can be obtained with use of the method according to a sixth embodiment which is shown in FIG. 10.

Figure 10:
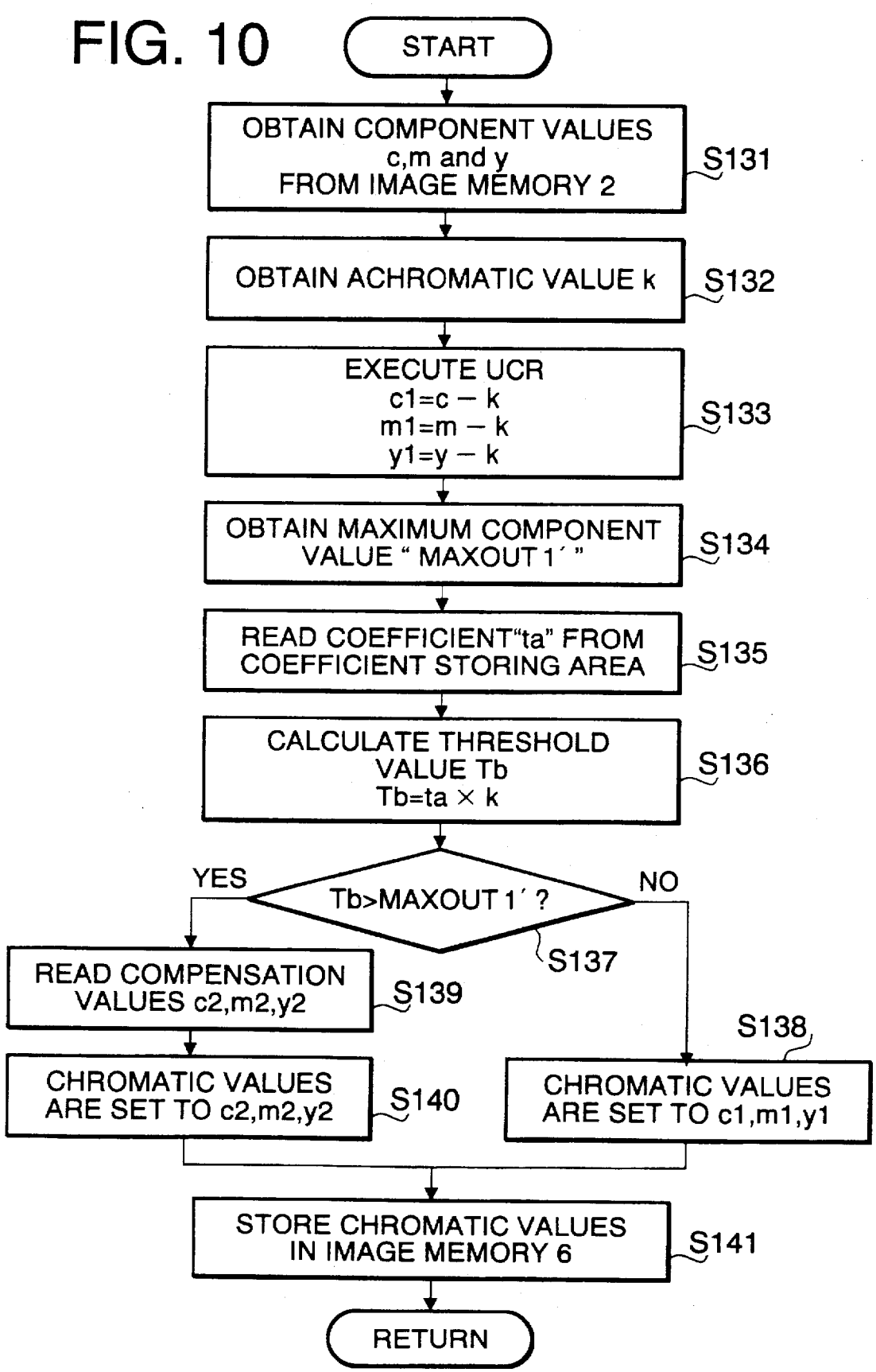
FIG. 10 is a flowchart illustrating a conversion of the color signal according to a sixth embodiment.

In FIG. 10, steps S131 through S134 are similar to steps S91 through S94 of FIG. 7. At S135, the CPU 5 reads a threshold coefficient ta out of the threshold coefficient storing area 20 of the RAM 30. Then, a threshold value Tb is calculated by adding the threshold coefficient ta and the value k (S136).

In step S137, the maximum value MAXOUT1' of the component values c, m, y is compared with the threshold value Tb. Depending on the result of the comparison at S137, the chromatic values c1, m1, y1 or the compensation values c2, m2, y2 are selected as the new chromatic values in steps S97 through S100, which process is similar to the process in S97 through S100 of FIG. 8. The selected chromatic values and the value k are stored in the image memory 6 at step S141.

In the foregoing embodiments, the color signal consisting of components corresponding to the subtractive primaries C, M and Y, and the minimum value of the components is used as the value k. However, the invention is not limited to such embodiments. For example, a color signal consisting of components of the additive primaries, R, G and B can be used. In such a case, the maximum value among the component values is obtained, and then the achromatic value k is determined based on the maximum component value.

Alternatively, the achromatic value k can be obtained based on the average value of the all component values of a color signal. In this case, negative chromatic values may be set to zero. Further, linear or non-linear functions can also be introduced to determine the value k. In such a case, the achromatic value k is expressed, for example, as a function of quantities of components of chromatic primaries.

With use of the color signal converting device described above, the input color signal which is, for example, generated by a scanner, is converted to the signal consisting of the three chromatic and one achromatic color components. During the conversion, the chromatic color components which would likely stain an area having only an achromatic color can be removed. Therefore, superimposition of a chromatic color image on an image having evenly distributed achromatic color, or blur of the chromatic color image at the border between the chromatic color and achromatic color portions can be avoided.

Further, the removal of the chromatic color components is performed in accordance with a threshold value, and the threshold value is changeable, an operator can adjust the reproduced image (i.e., printed image) to have preferable color.

Furthermore, since the color signal converting device according to the embodiments can output four-component color signal consisting of three chromatic and one achromatic color signal, a color image having relatively high quality, and free from superimposition of a chromatic color image on an image having evenly distributed achromatic color, or blur of the chromatic color image at the border between the chromatic color and achromatic color portions can be obtained.

The present disclosure relates to subject matter contained in Japanese Patent Application No. HEI 7-217201, filed on Aug. 25, 1995, which is expressly incorporated herein by reference in its entirety.

What is claimed is:

1. A method of converting a color signal consisting of a plurality of chromatic color components into another color signal consisting of said plurality of chromatic color components and an achromatic color component, the method comprises the steps of:
   obtaining an achromatic value of said chromatic color components;
   executing an under color removal in order to obtain a chromatic value for each of said plurality of chromatic color components;
   determining whether said chromatic values for said plurality of chromatic color components should be replaced with predetermined values;
   replacing said chromatic values with said predetermined values if it is determined in the determining step that said chromatic values for said plurality of chromatic color components should be replaced with predetermined values; and
   outputting said another color signal, said chromatic components and achromatic component of said another color signal having said chromatic values and said achromatic value, respectively;
   wherein said determining step includes the steps of:
      calculating ratios of said chromatic values to said achromatic value, respectively;
      obtaining the maximum value among said ratios of said chromatic values to said achromatic value; and
      comparing said maximum value with a predetermined threshold value, and
   wherein said determining step determines that said chromatic values for said plurality of chromatic color components should be replaced with predetermined values if said maximum value is smaller than said threshold value.

2. The method according to claim 1, wherein said chromatic color components comprise components of subtractive primaries.

3. The method according to claim 1, wherein said predetermined values are all zero.

4. The method according to claim 3, wherein each of said predetermined values is changeable.

5. A method of converting a color signal consisting of a plurality of chromatic color components into another color signal consisting of said plurality of chromatic color components and an achromatic color component, the method comprises the steps of:
   obtaining an achromatic value of said chromatic color components;
   executing an under color removal in order to obtain a chromatic value for each of said plurality of chromatic color components;
   determining whether said chromatic values for said plurality of chromatic color components should be replaced with predetermined values;
   replacing said chromatic values with said predetermined values if it is determined in the determining step that said chromatic values for said plurality of chromatic color components should be replaced with predetermined values; and
   outputting said another color signal, said chromatic components and achromatic component of said another color signal having said chromatic values and said achromatic value, respectively;
   wherein said determining step includes the steps of:
      calculating ratios of component values of said chromatic color components to said achromatic value;
      obtaining the maximum value among said ratios of said component values to said achromatic value; and
      comparing said maximum value with a predetermined threshold value, and
   wherein said determining step determines that said chromatic values for said plurality of chromatic color components should be replaced with predetermined values if said maximum value is smaller than said threshold value.

6. The method according to claim 5, wherein said predetermined values are all zero.

7. The method according to claim 5, wherein each of said predetermined values is changeable.

8. The method according to claim 5, wherein said chromatic color components comprise components of subtractive primaries.

9. A method of converting a color signal consisting of a plurality of chromatic color components into another color siqnal consisting of said plurality of chromatic color components and an achromatic color component, the method comprises the steps of:

obtaining an achromatic value of said chromatic color components;

executing an under color removal in order to obtain a chromatic value for each of said plurality of chromatic color components;

determining whether said chromatic values for said plurality of chromatic color components should be replaced with predetermined values;

replacing said chromatic values with said predetermined values if it is determined in the determining step that said chromatic values for said plurality of chromatic color components should be replaced with predetermined values; and outputting said another color signal, said chromatic components and achromatic component of said another color signal having said chromatic values and said achromatic value, respectively;

wherein said determining step includes the steps of:
obtaining the maximum value within said chromatic values;
calculating a threshold value; and
comparing said maximum value with said threshold value, and
wherein said determining step determines that said chromatic values for said plurality of chromatic color components should be replaced with predetermined values if said maximum value is smaller than said threshold value.

10. The method according to claim 9, wherein said calculating step calculates said threshold value in accordance with said achromatic value.

11. The method according to claim 10, wherein said calculating step multiplies said achromatic value by a predetermined coefficient to obtain said threshold value.

12. The method according to claim 11, wherein said predetermined values are all zero.

13. The method according to claim 11, wherein each of said predetermined coefficient is changeable.

14. The method according to claim 9, wherein said chromatic color components comprise components of subtractive primaries.

15. A method of converting a color signal consisting of a plurality of chromatic color components into another color signal consisting of said plurality of color components and an achromatic color component, the method comprises the steps of:

obtaining an achromatic value of said chromatic color components;

executing an under color removal in order to obtain a chromatic value for each of said plurality of chromatic color components;

determining whether said chromatic values for said plurality of chromatic color components should be replaced with predetermined values;

replacing said chromatic values with said predetermined values if it is determined in the determining step that said chromatic values for said plurality of chromatic color components should be replaced with predetermined values; and outputting said another color signal, said chromatic components and achromatic component of said another color signal having said chromatic values and said achromatic value, respectively;

wherein said determining step includes the steps of:
obtaining the maximum value within component values of said chromatic color components;
calculating a threshold value; and
comparing said maximum value with said threshold value, and
wherein said determining step determines that said chromatic values for said plurality of chromatic color components should be replaced with predetermined values if said maximum value is smaller than said threshold value.

16. The method according to claim 15, wherein said calculating step calculates said threshold value in accordance with said achromatic value.

17. The method according to claim 16, wherein said calculating step multiplies said achromatic value by a predetermined coefficient to obtain said threshold value.

18. The method according to claim 17, wherein said predetermined values are all zero.

19. The method according to claim 17, wherein each of said predetermined coefficient is changeable.

20. The method according to claim 15, wherein said chromatic color components comprise components of subtractive primaries.

* * * * *